May 2, 1933.    J. D. RAUCH    1,906,415
TRACTOR TRUCK
Filed May 20, 1931    2 Sheets-Sheet 1
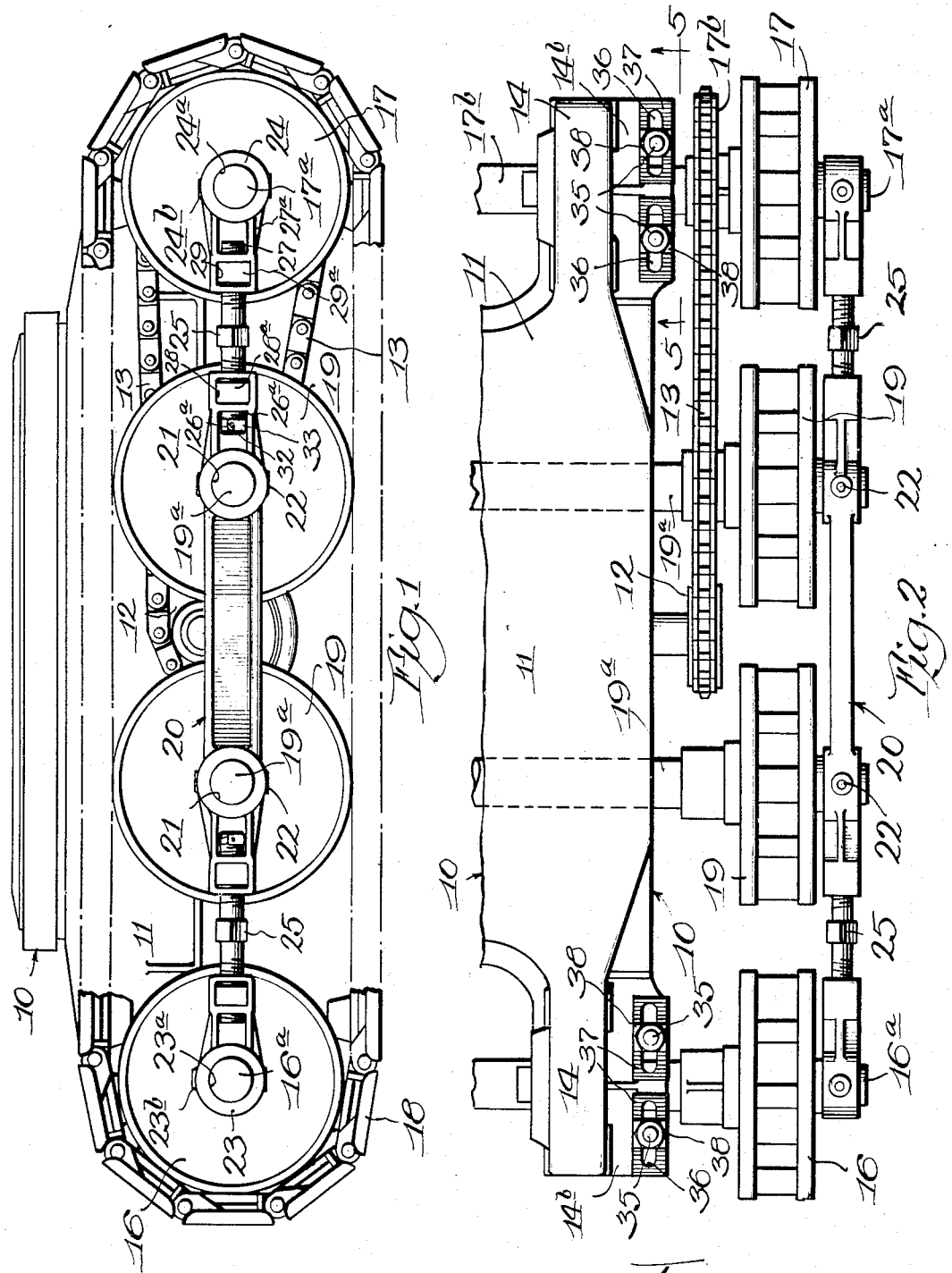

May 2, 1933.  J. D. RAUCH  1,906,415
TRACTOR TRUCK
Filed May 20, 1931  2 Sheets-Sheet 2
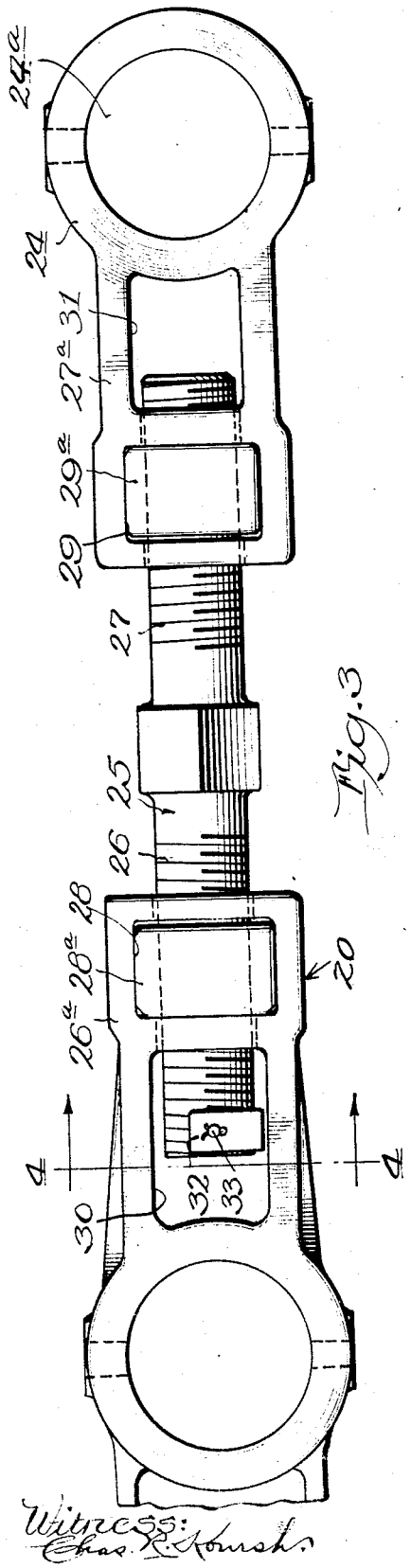
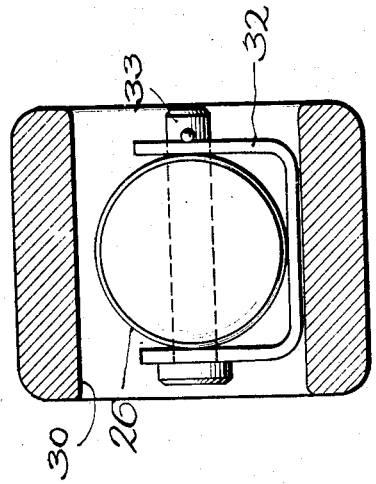
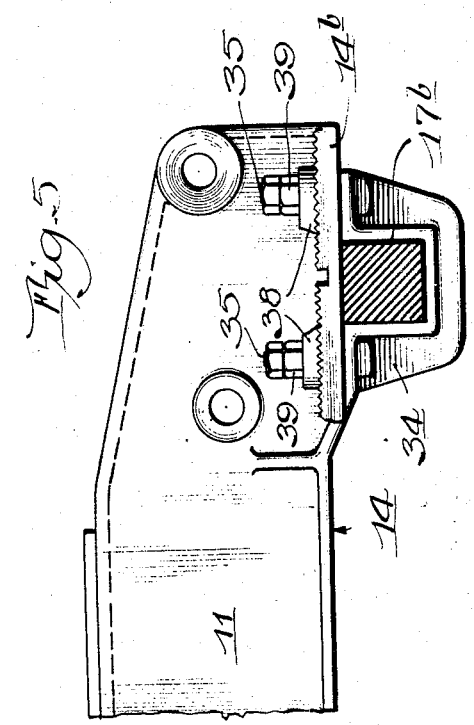

Patented May 2, 1933

1,906,415

UNITED STATES PATENT OFFICE

JOHN D. RAUCH, OF LIMA, OHIO, ASSIGNOR TO THE OHIO POWER SHOVEL COMPANY, OF LIMA, OHIO, A CORPORATION OF OHIO

TRACTOR TRUCK

Application filed May 20, 1931. Serial No. 538,636.

This invention relates to improvements in endless tread tractor trucks, and has for its principal object to provide an improved bearing and adjusting means for the tread-supporting wheels and their axles.

More specifically, my invention is directed to the type of endless tread mechanism in which both the end and intermediate tread supporting wheels are relatively large in diameter so as to engage both the upper and lower flights of the tread, and in which said wheels are mounted on axles projecting from the body of the truck. Such axles must necessarily be made very strong and rigid to prevent bending due to the long lateral reach from the sides of the truck frame to the center of the relatively wide treads.

In carrying out my invention, I provide an improved form of side bar applied to the ends of the several axles, outside of their tread supporting wheels, but entirely independent of the main truck frame. This arrangement affords mutual supporting connections between the outer ends of said axles. The side bar structure also includes an improved adjusting device for the two end axles. These and other features of the invention will more fully appear as the following description proceeds.

In the drawings forming a part of this application:

Figure 1 is a side view of a tractor truck to which my invention has been applied.

Figure 2 is a fragmentary plan view of one of the tread mechanisms of the truck shown in Figure 1, but showing the endless tread removed.

Figure 3 is an enlarged detail view of one end of the side frame.

Figure 4 is a detail section taken on line 4—4 of Figure 3.

Figure 5 is a section taken on line 5—5 of Figure 2, showing part of the axle adjusting means.

Referring to details of the embodiment of my invention shown in the drawings, a tractor truck is indicated generally at 10, herein consisting of a turntable base frame 11 suitable for a power shovel or the like, and having power devices (not shown) for driving the tread through a chain sprocket 12 and drive chain 13. The base frame 11 has side frame members 14 along opposite sides, and projecting at the ends of the frame as shown.

End wheels 16 and 17 have the endless tread 18 trained thereover, said end wheels being mounted on end axles $16^a$ and $17^a$, respectively, extending the width of the frame and supported on the projecting ends of the side frames 14. Each of said axles is adjustable along its respective side frame, as will hereinafter more fully appear.

A plurality of intermediate tread supporting wheels 19, 19 are provided between the end wheels, said intermediate wheels being of substantially the same diameter as said end wheels, and arranged to have supporting engagement with both the upper and lower flights of the tread. Said intermediate wheels are mounted on axles $19^a$, $19^a$ preferably of the thru-axle type, rigidly secured to the side frames 14.

Referring now to my improved side frame forming the particular feature of novelty of my invention, the same is indicated generally at 20, and comprises an elongated bar having a pair of spaced bearing apertures 21, 21 adapted to fit over the ends of the intermediate axles $19^a$, $19^a$ on the outside of their wheels 19, 19. In the form shown, the axles $19^a$, $19^a$ are of the rigid type, so the side bar is secured thereto as by pins 22, 22.

The side bar 20 also includes a pair of extended brackets 23, 24 having bearing apertures $23^a$, $24^a$, respectively, engaging the ends of axles $16^a$ and $17^a$. In the form shown, said brackets 23 and 24 are provided with longitudinally extensible adjustment devices 25, 25, herein of the turnbuckle type, designed to give positive adjustment of the end axles toward and away from the intermediate axles, and longitudinally of the main frame. With the form of chain drive tread illustrated herein, both the end axles $16^a$ and $17^a$ are provided with longitudinal adjusting means, since adjustment of the axle $16^a$ affords adjustment for the tread, while adjustment of axle $17^a$ affords an independent take-up for the drive chains 13 connected to the chain sprocket 17ᵇ on each of the drive wheels 17.

The turnbuckle adjusting devices for the end axles being similar, a description of one such device will be understood to apply to all.

Referring to the detail view of the turnbuckle shown in Figure 3, the same comprises a turnbuckle member 25 having left and right hand screws 26 and 27 thereon adapted to extend lengthwise into brackets 26ª and 27ª forming extensions of the side bar 20 and the end bracket 24 thereof, respectively. Rectangular apertures 28 and 29 are formed transversely in the two brackets 26ª and 27ª, respectively, which apertures are adapted to receive rectangular nuts 28ª and 29ª through which the screws 26 and 27 of the turnbuckle have threaded engagement. The outer ends of said screws extend into recesses 30 and 31, which are elongated to permit desired endwise adjustment of the parts.

In one of the recesses, as for instance recess 30, a locking member is provided, said locking member consisting of a U-shaped member 32 pivotally mounted on pin 33 extending transversely through the end of the screw 26 in position to permit the U-shaped member 32 to be swung outwardly over the end of said screw. As shown in Figures 3 and 4, the member 32 is swung into locking position to engage one face of the recess 30 and restrain the turnbuckle member 25 from rotation. Said locking member is unlocked by swinging the member 32 outwardly over the end of the screw so as to permit said screw with its locking member 32 to be rotated freely.

It will now be observed that by manipulation of the turnbuckle members 25, 25, the end axles 16ª and 17ª may be positively adjusted longitudinally of the main frame.

Means are also provided for securing the end axles to the main frame in the various adjusted positions relative thereto. In the form shown, it will be seen that the side frame members 14 rest upon the squared portion 17ᵇ of the end axle 17ª (see Figure 5). A U-shaped bracket 34 surrounds the axle and has a pair of bolts 35, 35 extending upwardly from the bracket through extending slots 36, 36 formed in a laterally flanged portion 14ᵇ at one end of the side frame member 14. The upper portion of the flange adjacent the slots is serrated as indicated at 37, 37. A pair of co-operating serrated blocks 38, 38 are mounted on the bolts and are secured thereon by nuts 39, 39 threaded on said bolts so as to maintain the axle in any position of longitudinal adjustment to which it may be placed by means of its respective turnbuckle device 25, as hereinbefore described.

It will now be understood from the above description that the side bar 20 including its connected end brackets 23 and 24 are entirely independent of the main truck frame, and are connected to the outer ends of the through axles which carry the tread supporting wheels in such manner as to afford mutual supporting connections between all of said axles at points remote from the main frame, where such axles are subject to the greatest bending moments. This construction therefore makes it possible to utilize lighter axles and eliminate tendency of bending thereof, particularly in connection with the end axles which support the ends of the tread.

A further advantage is provided by reason of the readily accessible position of the axle adjusting devices 25 on the outside of the frame, instead of locating the axle adjusting devices, as heretofore, on the side frames and on the inside of the tread supporting wheels.

Although I have illustrated and described one particular embodiment of my invention, it will be understood that I do not wish to be limited to the exact construction shown and described, but that various changes and modifications may be made without departing from the spirit and scope of my invention.

I claim:

1. In a tractor having an endless tread, a main frame, a pair of end axles having tread-supporting wheels, means for securing one of said end axles in longitudinally adjustable positions along said main frame, intermediate axles having tread-supporting wheels engaging the upper and lower flights, and a side bar independent of said main frame connecting the outer ends of said axles at the outside of said supporting wheels, said side bar including positive longitudinal adjusting means between said adjustable axle and the adjacent intermediate axle.

2. In a tractor having an endless tread, a main frame, a pair of end axles having tread-supporting wheels, means for driving said endless tread including a chain, and a sprocket on one of said end tread-supporting wheels, means for securing both of said end axles in longitudinally adjustable positions along said main frame, intermediate axles having tread-supporting wheels engaging the upper and lower flights, and a side bar independent of said main frame connecting the outer ends of said axles at the outside of said supporting wheels, said side bar including positive longitudinal adjusting means between each of said adjustable end axles and the adjacent intermediate axle, whereby the tension of said endless tread may be adjusted independently of the adjustment of the tension of said driving chain.

Signed at Lima, Ohio, this 15th day of May, 1931.

JOHN D. RAUCH.